United States Patent
Yang et al.

(10) Patent No.: US 11,182,583 B2
(45) Date of Patent: Nov. 23, 2021

(54) DISPLAY PANELS AND DISPLAY DEVICES

(71) Applicant: Yungu (Gu'an) Technology Co., Ltd., Langfang (CN)

(72) Inventors: Xiaolong Yang, Kunshan (CN); Rubo Xing, Kunshan (CN); Jiantai Wang, Kunshan (CN); Qi Shan, Kunshan (CN); Huimin Liu, Kunshan (CN)

(73) Assignee: Yungu (Gu'an) Technology Co., Ltd., Langfang (CN)

( * ) Notice: Subject to any disclaimer, the term of this patent is extended or adjusted under 35 U.S.C. 154(b) by 0 days.

(21) Appl. No.: 16/514,041

(22) Filed: Jul. 17, 2019

(65) Prior Publication Data

US 2019/0340408 A1 Nov. 7, 2019

Related U.S. Application Data

(63) Continuation of application No. PCT/CN2018/090999, filed on Jun. 13, 2018.

(30) Foreign Application Priority Data

Dec. 29, 2017 (CN) .......................... 201721902349.X

(51) Int. Cl.
*G06K 9/00* (2006.01)
*G06F 3/041* (2006.01)
*H01L 27/146* (2006.01)

(52) U.S. Cl.
CPC ......... *G06K 9/0004* (2013.01); *G06F 3/0412* (2013.01); *H01L 27/14643* (2013.01)

(58) Field of Classification Search
CPC combination set(s) only.
See application file for complete search history.

(56) References Cited

U.S. PATENT DOCUMENTS

| | | | | |
|---|---|---|---|---|
| 2009/0021487 | A1* | 1/2009 | Tien | G06F 3/041 345/173 |
| 2014/0048854 | A1* | 2/2014 | Wang | G06F 3/0443 257/254 |
| 2016/0350570 | A1* | 12/2016 | Han | G06F 3/04164 |
| 2016/0350577 | A1* | 12/2016 | Yang | G06K 9/00053 |
| 2017/0140194 | A1* | 5/2017 | Qin | G06F 3/0446 |
| 2017/0193265 | A1* | 7/2017 | Chan | G06F 3/0446 |

(Continued)

FOREIGN PATENT DOCUMENTS

| | | | |
|---|---|---|---|
| CN | 105139793 | A | 12/2015 |
| CN | 106096595 | A | 11/2016 |

(Continued)

*Primary Examiner* — William Boddie
*Assistant Examiner* — Alecia D English
(74) *Attorney, Agent, or Firm* — Maier & Maier, PLLC

(57) ABSTRACT

Display panels and display devices, in order to provide a new full screen solution that can realize fingerprint recognition. The display panel includes a substrate, a display film layer located on a surface of the substrate and a touch film layer located above the display film layer. The display panel further includes a fingerprint recognition film layer including a plurality of image sensing elements arranged in an array, and an orthographic projection of the image sensing element on the substrate is not overlapped with an orthographic projection of the light-emitting sub-pixels in the display film layer on the substrate.

13 Claims, 2 Drawing Sheets

(56) References Cited

U.S. PATENT DOCUMENTS

2017/0285778 A1* 10/2017 Liang ................. G06K 9/00053
2018/0005007 A1*  1/2018 Du ........................ G06K 9/2036
2018/0129798 A1*  5/2018 He ........................... G06F 3/042
2018/0211090 A1*  7/2018 Yang ....................... G06F 3/044
2019/0050096 A1*  2/2019 Wang ...................... G06F 3/044
2019/0294846 A1*  9/2019 Li ........................ G06K 9/0002

FOREIGN PATENT DOCUMENTS

| CN | 106898636 A | 6/2017 |
| CN | 106959757 A | 7/2017 |
| KR | 20050072956 A | 7/2005 |

* cited by examiner

DISPLAY PANELS AND DISPLAY DEVICES

CROSS-REFERENCE

This application is a continuation of International Application No. PCT/CN2018/090999, filed on Jun. 13, 2018, which claims priority to Chinese Patent Application No. 201721902349.X, entitled "DISPLAY PANELS AND DISPLAY DEVICES" filed on Dec. 29, 2017, the contents of which are expressly incorporated by reference herein in their entireties.

FIELD

Exemplary embodiments of the disclosure relate to display technologies, and in particular to display panels and display devices.

BACKGROUND

Currently, in a display panel with a fingerprint recognition function, its fingerprint recognition module is generally arranged in a non-display area of the display panel, and is mostly arranged at the position corresponding to the exposed Home key. Fingerprint information of a user can be collected when the user touches the Home key with his/her finger, and then the fingerprint recognition is completed based on the comparison result.

However, the fingerprint recognition module arranged in the non-display area will inevitably limit the full screen design of the display panel, which is unfavorable for realizing the full screen of the display panel.

Therefore, there is an urgent need to find a full screen solution that can realize fingerprint recognition.

SUMMARY

Exemplary embodiments of the disclosure provide a display panel and a display device to provide a new full screen solution that can realize fingerprint recognition.

To overcome the above technical problem, the exemplary embodiments of the disclosure can adopt the following technical solutions: a display panel comprises a substrate, a display film layer located on a surface of the substrate, and a touch film layer located above the display film layer. The display panel further comprises: a fingerprint recognition film layer comprising a plurality of image sensing elements arranged in an array, and an orthographic projection of the image sensing element on the substrate is not overlapped with an orthographic projection of a light-emitting sub-pixel in the display film layer on the substrate.

Optionally, an array density of the image sensing elements in the fingerprint recognition film layer is equal to or smaller than an array density of the light-emitting sub-pixels in the display film layer.

Optionally, the fingerprint recognition film layer is sandwiched between the display film layer and the touch film layer.

Optionally, the display panel further comprises an adhesive for bonding the fingerprint recognition film layer to the touch film layer, and bonding the fingerprint recognition film layer to the display film layer.

Optionally, the fingerprint recognition film layer is arranged between the substrate and the touch film layer.

Optionally, the fingerprint recognition film layer is arranged between the touch film layer and an encapsulation layer for encapsulating the display film layer.

Optionally, the fingerprint recognition film layer is arranged at a specific region of the touch film layer, and the specific region corresponds to an edge area, a middle lower portion and a middle upper portion of the display panel.

Optionally, the image sensing element is a semiconductor element.

Optionally, the image sensing element is a CMOS image sensing element.

Optionally, the CMOS image sensing element has a size ranging from 1 to 4 µm.

Optionally, in the fingerprint recognition film layer, a pixel density of the image sensing element ranges from 300 to 800 ppi.

Optionally, the touch film layer is a grid-patterned electrode, and the image sensing elements are arranged in the corresponding region of the corresponding grid and are arranged in the region close to the region corresponding to an intersection position between touch wirings located in the touch film layer.

Optionally, the touch wiring is arranged at a gap between the adjacent light-emitting sub-pixels in the corresponding display film layer, and the image sensing element is arranged at a gap between the adjacent light-emitting sub-pixels in the corresponding display film layer.

Optionally, an orthographic projection of the adjacent two boundaries of the image sensing element close to the intersection position between the touch wirings on the substrate is overlapped with an orthographic projection of the corresponding two adjacent touch wirings in the grid on the substrate.

A display device comprises any one of the above display panels.

The following beneficial effects can be achieved by at least one of the above-mentioned technical solutions adopted by the exemplary embodiments of the disclosure:

By providing a fingerprint recognition film layer, an orthographic projection of each image sensing element in the fingerprint recognition film layer on the substrate is not overlapped with an orthographic projection of a light-emitting sub-pixel in the display film layer on the substrate. Thus, although the fingerprint recognition film layer is arranged at a light-exiting side of the display film layer, the image sensing element reasonably avoids the light-emitting sub-pixel, thereby avoiding blocking the light-emitting sub-pixel and further reducing a barrier to light emitted by the display film layer; moreover, the image sensing element can effectively collect fingerprint information by means of the display film layer, thereby achieving under-display fingerprint recognition, which is favorable for designing the full screen.

DETAILED DESCRIPTION

The technical solution provided by exemplary embodiments of the disclosure will be described in detail below with reference to the accompanying drawings.

Figure 1:
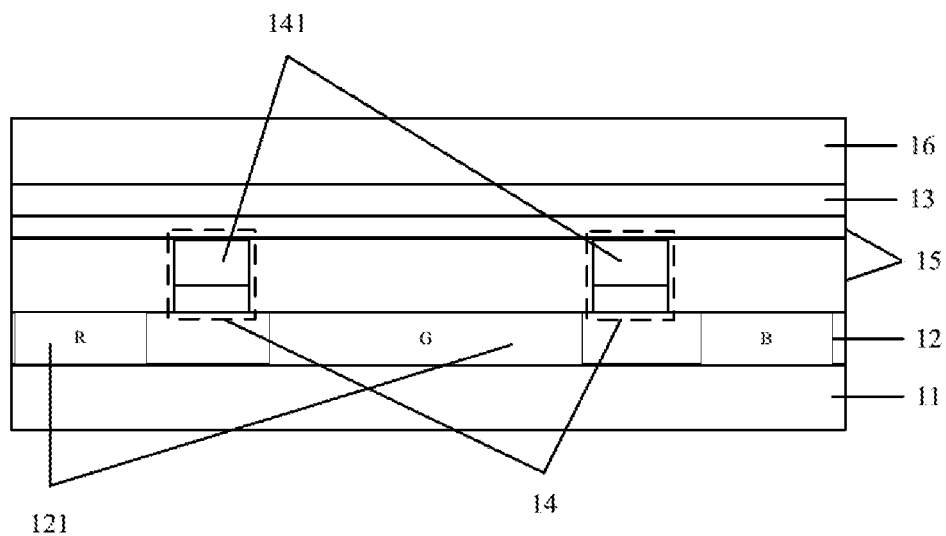
FIG. 1 is a schematic cross-sectional structural view of a display panel provided by an embodiment of the disclosure.

With reference to FIG. 1, FIG. 1 is a schematic partial cross-sectional structural view of a display panel provided by an embodiment of the disclosure. The display panel mainly includes a substrate 11, a display film layer 12 located on a surface of the substrate 11 and a touch film layer 13 located above the display film layer 12. The substrate may be a flexible material, and specifically, may be formed by a polymer such as polyethylene terephthalate (PET), polyimide (PI), and may also be a substrate made of plastic, rubber or glass materials. The substrate can better support such film layer structure formed on the surface thereof and ensure the stability of the overall film layer structure of the display panel. In addition, the display film layer 12 involved in FIG. 1 may be an OLED display film layer or a micro-LED display film layer. The type of the display film layer is not limited in the disclosure, and the disclosure is illustrated by taking only the OLED display film layer for example. The OLED display film layer includes a base, a light-emitting sub-pixel arranged in an array, a pixel definition layer arranged located at a gap between the adjacent light-emitting sub-pixels, and a thin film encapsulation layer for encapsulating the display film layer and so on. The structure of the OLED display film layer in the disclosure may be any achievable display film layer structure, which is not limited in the disclosure. In addition, the display panel further includes a cover plate 16 for covering the touch film layer 13.

Still with reference to FIG. 1, the display panel involved in the disclosure further includes a fingerprint recognition film layer 14 sandwiched between the display film layer 12 and the touch film layer 13; or may be arranged as any layer between the substrate 11 and the touch film layer 13; or may be arranged as any layer between the touch film layer 13 and the encapsulation layer; or may be arranged on the encapsulation layer and on any layer above the encapsulation layer; or may be arranged on any layer of the display panel. The fingerprint recognition film layer 14 includes a plurality of image sensing elements 141 arranged in an array, and an orthographic projection of the image sensing element 141 on the substrate 11 is not overlapped with an orthographic projection of the light-emitting sub-pixel 121 in the display film layer 12 on the substrate 11. Thus, although the fingerprint recognition film layer 14 is arranged at a light-exiting side of the display film layer 12, the image sensing element 141 reasonably avoids the light-emitting sub-pixel 121, thereby avoiding blocking the light-emitting sub-pixel 121 and further reducing barrier to light emitted by the display film layer 12; moreover, the image sensing element 141 can effectively collect fingerprint information by means of the display film layer 12, thereby achieving under-display fingerprint recognition, which is favorable for designing the full screen.

In fact, in the disclosure, the fingerprint recognition film layer 14 has a pattern, which can be understood as connecting these image sensing elements 141 to the corresponding processors via a plurality of transparent wires or transparent electrode layers for signal comparison or image comparison, thereby achieving fingerprint recognition. The specific connection relationship may be laid out according to the specific film layer structure design, preferably avoiding blocking the light-emitting sub-pixel 121.

It should be noted that, in the disclosure, the display panel also actually includes an adhesive 15 for bonding the fingerprint recognition film layer 14 to the touch film layer 13, and bonding the fingerprint recognition film layer 14 to the display film layer 12. The adhesive 15 is, for example, Optically Clear Adhesive (OCA) or other transparent glues, in order to ensure that the fingerprint recognition film layer and the adjacent film layer can be firmly bonded together.

Figure 2:
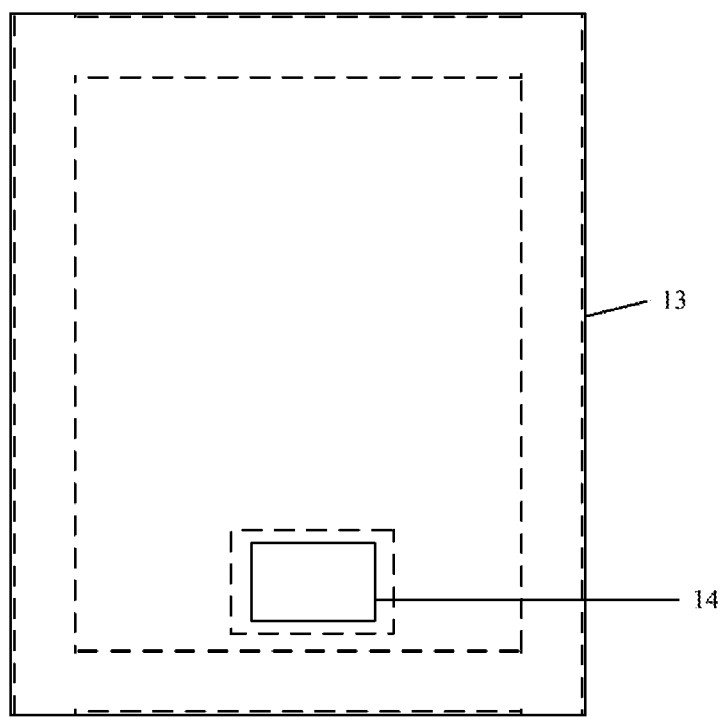
FIG. 2 is a schematic top view of a display panel provided by an embodiment of the disclosure.

In the disclosure, the fingerprint recognition film layer 14 is arranged at a specific region of the touch film layer, and the specific region corresponds to an edge area of the display panel. In fact, the specific region is not limited to be arranged within the entire surface of the display panel; with reference to FIG. 2, considering that the fingerprint recognition film layer is arranged under the screen body (cover plate), in order not to affect a display picture of the display area, the fingerprint recognition film layer 14 can be arranged in a specific region of the touch film layer 13 (shown by a broken line frame in FIG. 2). The specific region may be the edge area of the display panel, or a middle lower portion or a middle upper portion of the display panel, and according to the size of the fingerprint recognition film layer 14 that occupies all of or part of the specific region, arranging the specific region in the area of the display panel that faces eyes can thereby avoided.

Figure 3:
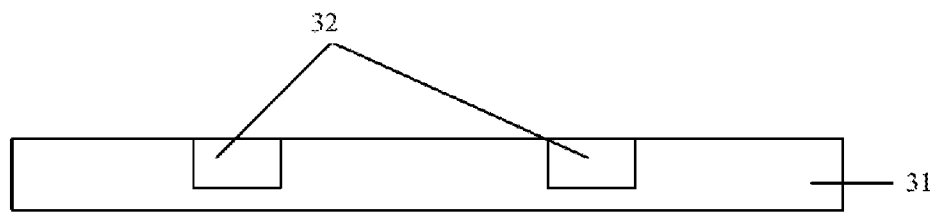
FIG. 3 is a schematic structural view of the film layer before subjecting the fingerprint recognition film layer to patterning treatment in the disclosure.

Alternatively, in the disclosure, the image sensing element may be a semiconductor element grown on a semiconductor substrate. Specifically, as shown in FIG. 3, the semiconductor element, such as an image sensing element 32, is formed on a semiconductor substrate 31 by adopting a crystal growth technique. In fact, FIG. 3 shows the structure of the film layer before subjecting the fingerprint recognition film layer 14 to patterning treatment. The film layer shown in FIG. 3 is directly arranged in one surface of the touch film layer 13 (the other surface of the touch film layer 13 is provided with a cover glass as a substrate), and thereafter, patterning is performed, and the portion of the semiconductor substrate corresponding to the image sensing element 32 is polished, thereby obtaining a patterned fingerprint film layer 14. It should be noted that the semiconductor substrate 31 involved in the disclosure may be a silicon wafer or other semiconductor materials. With reference to FIG. 1, a layer of thin semiconductor substrate 31 may remain on the surface of the patterned fingerprinting film layer 14, which does not affect the image collection by the image sensing element 32.

In fact, the image sensing element involved in the disclosure may specifically be a CMOS image sensing element. These CMOS image sensing elements constitute a CMOS image sensor CIS, which belongs to a solid-state imaging sensor, and usually comprises the following components, such as an image sensitive unit array, a row driver, a column driver, a timing control logic, an AD converter, a data bus output interface, a control interface. These components are usually integrated on the same piece of silicon, i.e. CIS.

In the disclosure, given that the orthographic projection of the image sensing element in the fingerprint recognition film layer on the substrate is not overlapped with the orthographic projection of the light-emitting sub-pixel in the display film layer on the substrate, an array density of the image sensing elements in the fingerprint recognition film layer is preferably the same as an array density of the light-emitting sub-pixels in the display film layer, i.e., one image sensing element corresponds to one light-emitting sub-pixel, which, in fact, is not limited by the disclosure, and may also be designed as the array density of the image sensing elements in the fingerprint recognition film layer being smaller than the array density of the light-emitting sub-pixels in the display film layer.

Figure 4:
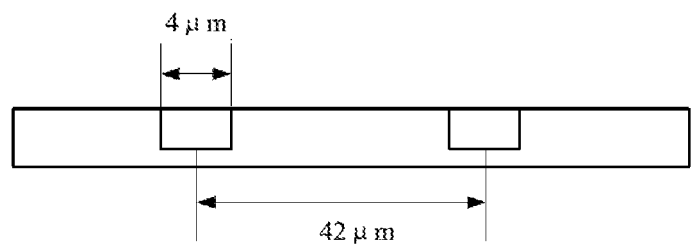
FIG. 4 is a schematic view showing the size of an image sensing element in the fingerprint recognition film layer in the disclosure.

In the disclosure, the CMOS image sensing element has a size ranging from 1 to 4 μm; as shown in FIG. 4, in order to ensure that enough signals can be collected in the subsequent process of collecting a fingerprint photosignal by the CMOS image sensing element, the CMOS image sensing element can be designed to be 4 μm.

Still with reference to FIG. 4, taking a display panel with 604 ppi as an example, the spacing between the adjacent CMOS image sensing elements in the fingerprint recognition film layer ranges from 41 to 43 μm, and preferably, the spacing between the adjacent CMOS image sensing elements is 42 μm. The pixel density of the image sensing element ranges from 300 to 800 ppi, and the pixel density of the image sensing element refers to the intensive degree of the image sensing elements throughout the entire panel.

Figure 5:
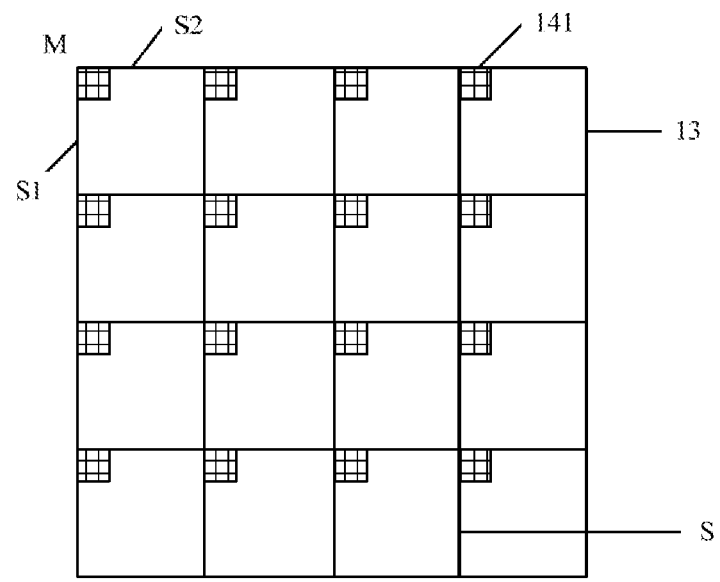
FIG. 5 is a schematic view showing the positions of the image sensing element in the fingerprint recognition film layer and a touch wiring in a touch film layer in the disclosure.

In the disclosure, the touch film layer is a grid-patterned electrode, and the image sensing elements are arranged in the corresponding regions of the corresponding grid and arranged in the region close to the region corresponding to the intersection position between the touch wirings. With reference to FIG. 5, taking a plurality of image sensing elements 141 arranged as a 4×4 array as an example, the touch film layer 13 is a grid-patterned electrode, and each image sensing element 141 is arranged in the corresponding region of the corresponding grid and is arranged in the region close to the region corresponding to the intersection position M between the touch wirings S. In fact, the touch wiring in the touch film layer is arranged at a gap between the adjacent light-emitting sub-pixels in the corresponding display film layer, to avoid blocking light emitted by the light-emitting sub-pixels. In conjunction with FIG. 1, the image sensing element 141 should also be arranged at the gap between the adjacent light-emitting sub-pixels 121 in the corresponding display film layer 12 in order to avoid the light-emitting sub-pixel 121. Considering that a space for the gap at the intersection position is slightly larger, the image sensing element is arranged at the intersection position between the touch wirings S of the touch film layer 13 in order to ensure that the light-emitting sub-pixels is not blocked as much as possible, thereby ensuring the light-exiting efficiency of the display panel.

Optionally, although the touch control layer has a thin touch wiring, the size of the image sensing element is not large, and therefore, in order to further reduce the barrier to the light-emitting sub-pixel caused by the image sensing element, an orthographic projection of the adjacent two boundaries of the image sensing element close to the intersection position between the touch wirings on the substrate is overlapped with an orthographic projection of the corresponding two adjacent touch wirings in the grid on the substrate. Still with reference to FIG. 5, taking a first grid at the upper left corner as an example, the orthographic projection of the adjacent two boundaries (the upper boundary and the left boundary of the image sensing element 141 in FIG. 5) of the image sensing element 141 close to the intersection position between the touch wiring S1 and the touch wiring S2 on the substrate (not shown) is in coincidence with the orthographic projection of the touch wiring S1 and the touch wiring S2 on the substrate (not shown). That is to say, the upper boundary of the image sensing element 141 is in coincidence with the touch wiring S2 and the left boundary of the image sensing element 141 is in coincidence with the touch wiring S1. The structural design can further reduce the barrier to the light-emitting sub-pixel caused by the image sensing element, thereby ensuring the light-exiting efficiency of the display panel.

It should be noted that, in the disclosure, the thickness of the film layer, the size of the components and the width of the wiring are not representative of the actual structural dimension, which should be on the basis of the actual production process requirements and design.

Meanwhile, the disclosure also proposes a display device which includes the display panel. In addition, the display device can be any products or components with the display function, such as a mobile phone, a tablet computer, a television, a display, a notebook computer, a digital photo frame, a navigator, a smart wearable device, a VR, and an AR. Other components indispensable to the display device should be understood by a person skilled in the art, which are not described in detail herein, nor should be construed as a limitation to the disclosure.

The above description is only exemplary embodiments of the disclosure and is not intended to limit the disclosure. As for a person skilled in the art, there are various modifications and changes in the disclosure. Any equivalent modifications, equivalent substitutions, improvements and the like made within the spirit and principle of the disclosure should be included in the scope of the appended claims of the disclosure.

What is claimed is:

1. A display panel, comprising:
a substrate, a display film layer located on a surface of the substrate, and a touch film layer located above the display film layer, the display panel, including:
a fingerprint recognition film layer with a plurality of image sensing elements arranged in an array, wherein an orthographic projection of the image sensing element on the substrate is not overlapped with an orthographic projection of the light-emitting sub-pixels in the display film layer on the substrate,
wherein the touch film layer includes touch wirings, and the touch wiring is arranged at a gap between the adjacent light-emitting sub-pixels in the corresponding display film layer,
wherein the image sensing element is arranged at the gap between the adjacent light-emitting sub-pixels, and
wherein the orthographic projection of the image sensing element is overlapped with an orthographic projection of the touch wiring arranged at the gap,
wherein the touch film layer is a grid-patterned electrode arranged by the touch wirings, and each of the image sensing elements is provided at a corresponding region of an intersection position between the touch wirings located in the touch film layer,
wherein an orthographic projection of the adjacent two boundaries of the image sensing element at the intersection position between the touch wirings on the substrate is overlapped with an orthographic projection of the corresponding two adjacent touch wirings in the grid on the substrate,
wherein the touch wirings arranged at the gap between the adjacent light-emitting sub-pixels, and the orthographic projection of the touch wirings are not overlapped with the orthographic projection of the light-emitting sub-pixels,
wherein the grid-patterned electrode arranged by the touch wirings forms a plurality of rectangles, and each image sensing element is located at one corner of each rectangle, such that adjacent two boundaries of each image sensing element are overlapped with the corner of each rectangle.

2. The display panel according to claim 1, wherein an array density of the image sensing elements in the fingerprint recognition film layer is equal to or smaller than an array density of the light-emitting sub-pixels in the display film layer.

3. The display panel according to claim 1, wherein the fingerprint recognition film layer is sandwiched between the display film layer and the touch film layer.

4. The display panel according to claim 3, wherein the display panel further comprises an adhesive for bonding the fingerprint recognition film layer to the touch film layer, and bonding the fingerprint recognition film layer to the display film layer.

5. The display panel according to claim 1, wherein the fingerprint recognition film layer is arranged between the substrate and the touch film layer.

6. The display panel according to claim 1, wherein the fingerprint recognition film layer is arranged between the touch film layer and an encapsulation layer for encapsulating the display film layer.

7. The display panel according to claim 1, wherein the fingerprint recognition film layer is arranged at a specific region of the touch film layer, and the specific region corresponds to an edge area, a middle lower portion and a middle upper portion of the display panel.

8. The display panel according to claim 1, wherein the image sensing element is a semiconductor element.

9. The display panel according to claim 8, wherein the image sensing element is a CMOS image sensing element.

10. The display panel according to claim 9, wherein the CMOS image sensing element has a size ranging from 1 to 4 μm.

11. The display panel according to claim 1, wherein in the fingerprint recognition film layer, a pixel density of the image sensing element ranges from 300 to 800 ppi.

12. The display panel according to claim 1, wherein the orthographic projection of the image sensing element at the intersection position between the touch wirings is overlapped with an orthographic projection of the corresponding intersection position.

13. A display device, comprising:
a display panel, the display panel including a substrate, a display film layer located on a surface of the substrate, and a touch film layer located above the display film layer, the display panel further including:
a fingerprint recognition film layer with a plurality of image sensing elements arranged in an array, wherein an orthographic projection of the image sensing element on the substrate is not overlapped with an orthographic projection of the light-emitting sub-pixels in the display film layer on the substrate,
wherein the touch film layer includes touch wirings, and the touch wiring is arranged at a gap between the adjacent light-emitting sub-pixels in the corresponding display film layer,
wherein the image sensing element is arranged at the gap between the adjacent light-emitting sub-pixels, and
wherein the orthographic projection of the image sensing element is overlapped with an orthographic projection of the touch wiring arranged at the gap,
wherein the touch film layer is a grid-patterned electrode arranged by the touch wirings, and each of the image sensing elements is provided at a corresponding region of an intersection position between the touch wirings located in the touch film layer,
wherein an orthographic projection of the adjacent two boundaries of the image sensing element at the intersection position between the touch wirings on the substrate is overlapped with an orthographic projection of the corresponding two adjacent touch wirings in the grid on the substrate,
wherein the touch wirings arranged at the gap between the adjacent light-emitting sub-pixels, and the orthographic projection of the touch wirings are not overlapped with the orthographic projection of the light-emitting sub-pixels,
wherein the grid-patterned electrode arranged by the touch wirings forms a plurality of rectangles, and each image sensing element is located at one corner of each rectangle, such that adjacent two boundaries of each image sensing element are overlapped with the corner of each rectangle.

* * * * *